United States Patent [19]
Onishi et al.

[11] Patent Number: 5,572,260
[45] Date of Patent: Nov. 5, 1996

[54] CLOSED CAPTION DECODER HAVING PAUSE FUNCTION SUITABLE FOR LEARNING LANGUAGE

[75] Inventors: Yasushi Onishi; Shoichi Kamimura, both of Hyogo, Japan

[73] Assignees: Mitsubishi Electric Semiconductor Software Co. Ltd., Hyogo; Mitsubishi Denki Kabushiki Kaisha, Tokyo, both of Japan

[21] Appl. No.: 505,418

[22] Filed: Jul. 21, 1995

[30] Foreign Application Priority Data

Mar. 20, 1995 [JP] Japan .................................. 7-060437

[51] Int. Cl.$^6$ .................................................. H04N 7/087
[52] U.S. Cl. ........................ 348/460; 348/569; 348/468
[58] Field of Search ...................... 348/460, 467, 348/465, 468, 563, 564, 569, 589; H04N 7/087

[56] References Cited

U.S. PATENT DOCUMENTS 5,283,648  1/1994  Jeung ........................................ 348/468
5,375,160  12/1994  Guidon et al. ........................... 348/468

OTHER PUBLICATIONS

Closed Caption Decoder Requirements from FCC Report and Order FCC 91–119 as modified by FCC Memorandum, Opinion and Order FCC 92–157.
Recommended Practice for Line 21 Data Services—Part One—Introduction, Jul. 6, 1994, pp. 1–126.

*Primary Examiner*—Victor R. Kostak
*Attorney, Agent, or Firm*—Lowe, Price, LeBlanc & Becker

[57] ABSTRACT

A closed caption decoder with a pause function suitable for learning a language comprising: a closed caption decode circuit for decoding closed caption signals included in video signals outputted from a video cassette recorder and for outputting a detection signal when a predetermined control code is decoded; a timer which measures an elapse of time from a time when the predetermined control code is decoded; and a pause control circuit for instructing the caption decode means to perform a pause operation of caption decode and the video cassette recorder to perform a pause of video reproduction when the detection signal is outputted form the closed caption decode circuit and for outputting a pause termination signal of caption decode to the closed caption decoder and a pause termination signal of video reproduction to the video cassette recorder when the timer measures a predetermined period of time.

12 Claims, 6 Drawing Sheets

| STEP | SCREEN | DECODE DATA | FUNCTION |
|---|---|---|---|
| 1 | | [14. 20] | DESIGNATE POP-ON MODE |
| 2 | | [13. 50]<br>"THIS IS FOR YOU" | STORE CHARACTER DATA ON NON-DISPLAY MEMORY |
| 3 |  | [14. 2F] | SWAP DISPLAY MEMORY AND NON-DISPLAY MEMORY |
| 4 |  | [14. 2C] | ERASE DISPLAY MEMORY |
| 5 |  | [14. 20]<br>[13. 50]<br>"I CAN TAKE ANYTHING"<br>[13. 70]<br>"WHAT I WANT" | STORE CHARACTER DATA ON NON-DISPLAY MEMORY |
| 6 |  | [14. 2F] | SWAP DISPLAY MEMORY AND NON-DISPLAY MEMORY |

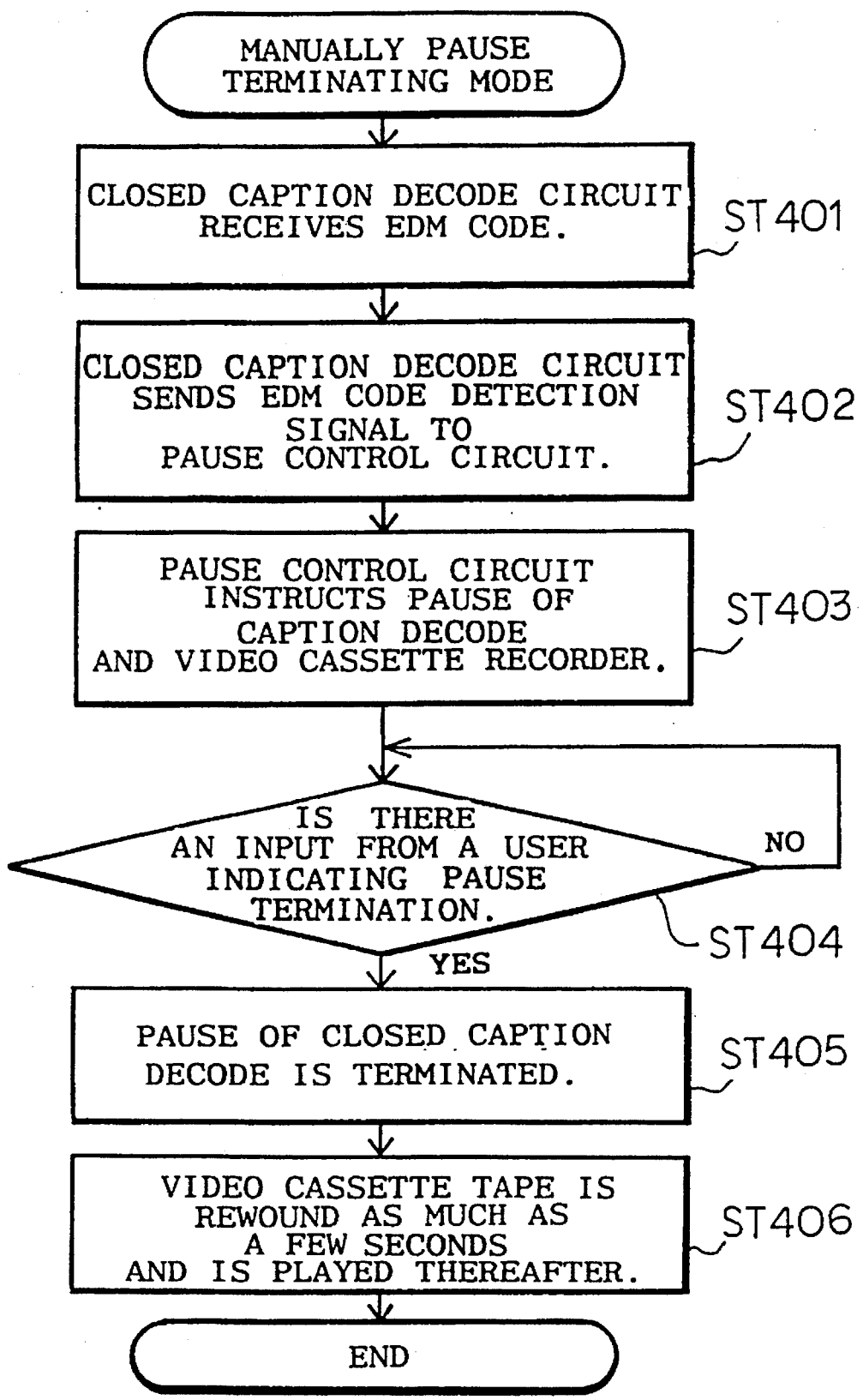

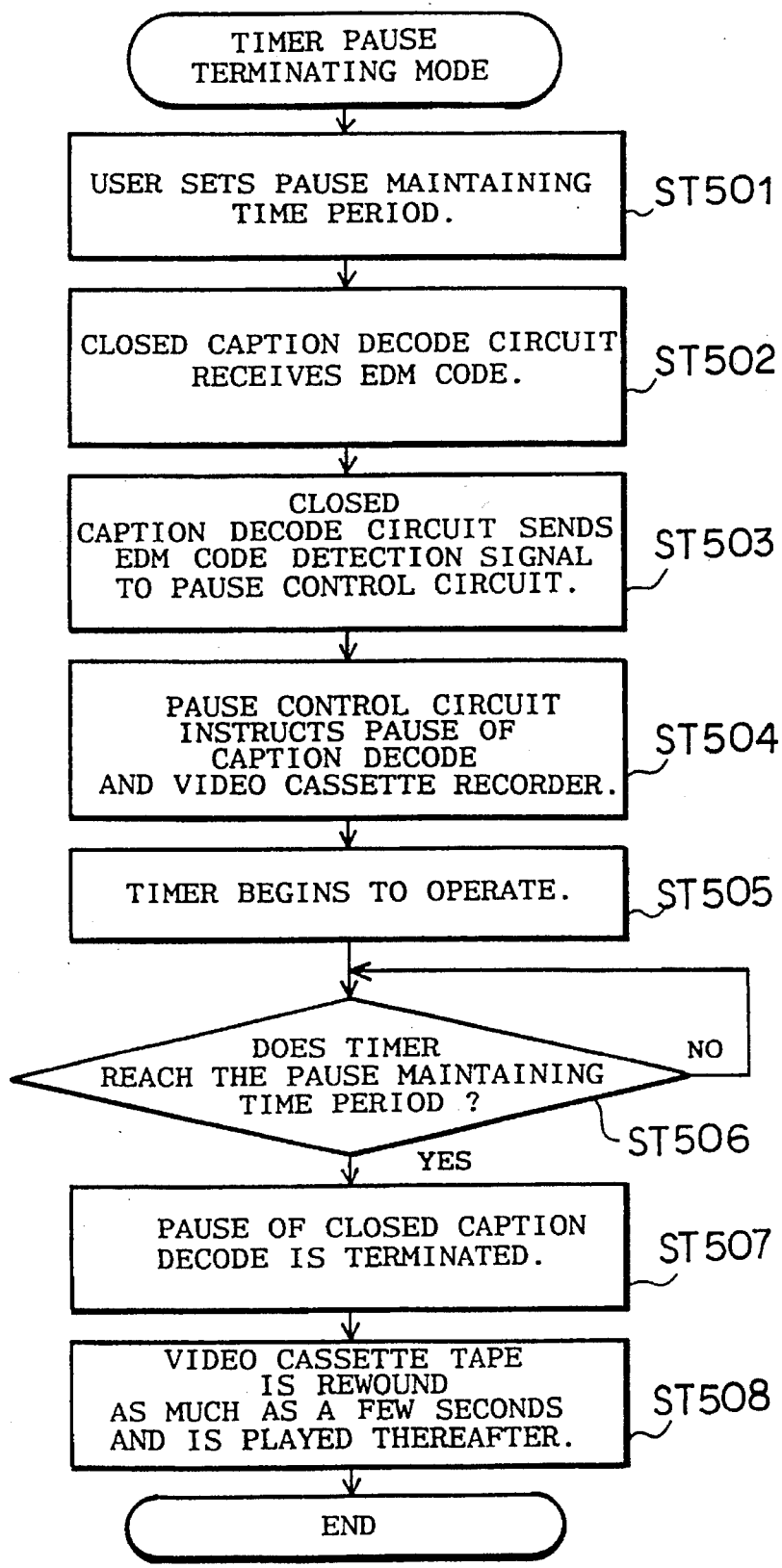

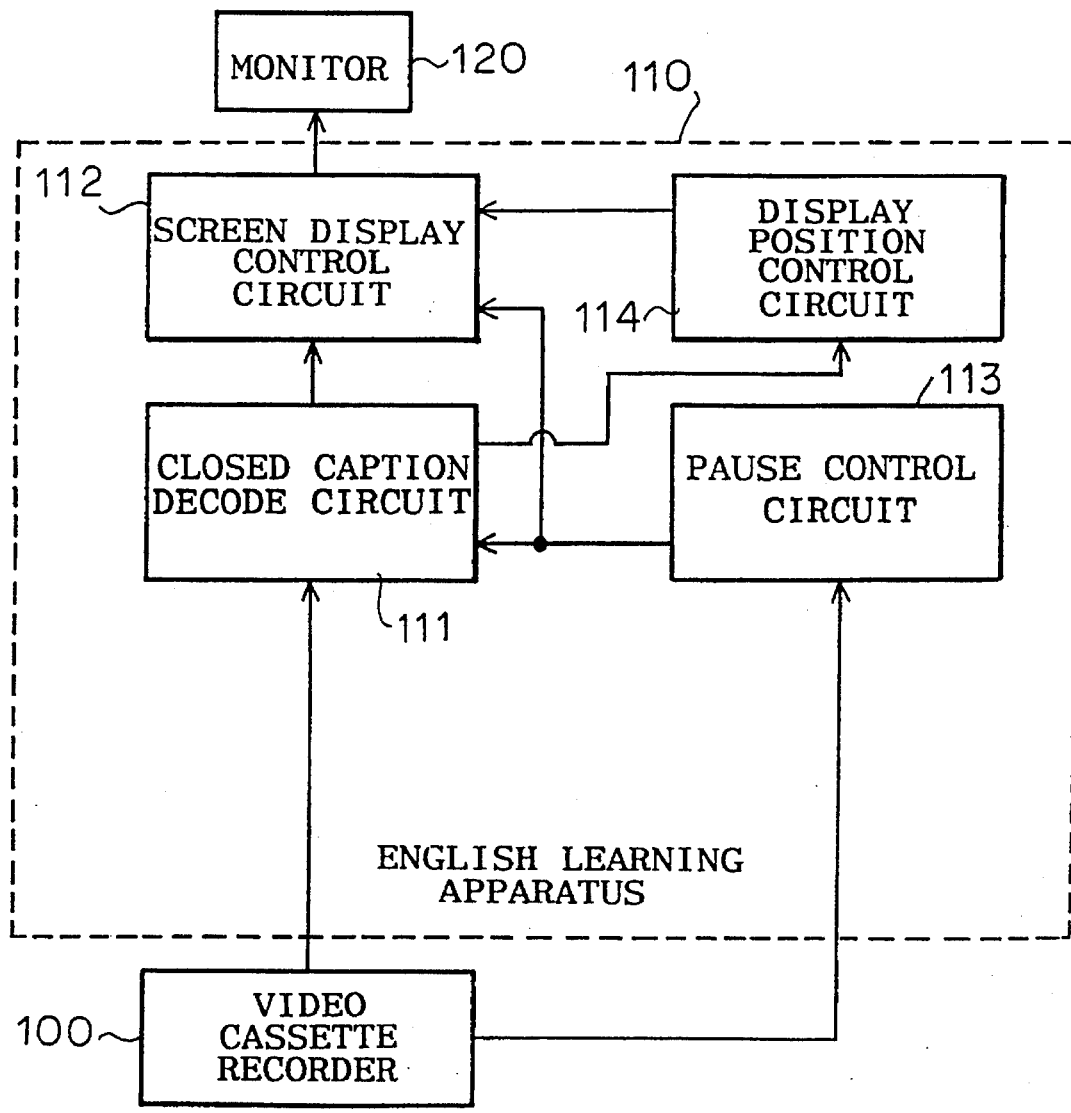

CLOSED CAPTION DECODER HAVING PAUSE FUNCTION SUITABLE FOR LEARNING LANGUAGE

BACKGROUND OF THE INVENTION

1. Field of the Invention

This invention relates to a closed caption decoder, especially to a closed caption decoder equipped with a pause control function for learning languages.

2. Description of the Related Art

A closed caption system is adopted in the United States for deaf people, which displays subtitles on a screen when desired. In this system, closed caption signals are superimposed on the television signals. The closed caption signals are decoded by a closed caption decoder installed at each house thereby subtitles can be displayed on the screen of a television when desired.

The format of the closed caption signals is prescribed by the Federal Communications Commission (FCC) and according to the regulation of the FCC, display control codes indicating character information, position, color and display status are encoded in closed caption signals. Further, closed caption signals are being superimposed on more and more video software tapes and the subtitles corresponding to the closed caption recorded in the video software tapes can be displayed on a screen in the same way as that of a television.

Incidentally, a closed caption decoder is also utilized as an apparatus for learning languages in combination with a video cassette recorder by making use of the feature that subtitles are displayed on the screen of a television.

When a closed caption system is used for a language study, a caption pause function to stop displaying subtitles is necessary in order to match the speed of flowing subtitles on a screen with the speed at which a user can understand the voice from the video cassette tape. Further, for a video software tape in which the other language such as Japanese has already been superimposed on the tape, it is necessary to mask Japanese language subtitles by changing the position of the closed caption.

FIG. 6 is a block diagram showing the configuration of a conventional apparatus for studying English using a closed caption decoder. In this figure, reference numeral 100 denotes a video cassette recorder which reproduces a video software tape, 110 denotes an English learning apparatus, 111 denotes a closed caption decode circuit which performs decode processing by extracting characters to be displayed on a screen from the closed caption signals superimposed on video signals outputted from video cassette recorder 100, 112 denotes a screen display control circuit which produces image signals by superimposing the decoded characters with the image outputted from the video cassette recorder 100 and which outputs the superimposed image signals, 113 denotes a pause control circuit which provides an instruction to the closed caption decode circuit 111 that the closed caption decode circuit 111 should perform a pause operation when an image signal outputted from the video cassette recorder 100 which is in a pause operation is received, 114 denotes a display position control circuit which provides an instruction of a display position to the screen display control circuit 112 so that closed caption characters are displayed at a desired position on a screen, 120 denotes a monitor such as a Cathode Ray Tube (CRT) display.

Firstly, image signals including the data of 16 bits in every field for closed caption are outputted from the video cassette recorder 100 upon start of the reproducing operation of the video cassette recorder 100. The closed caption decode circuit 111 performs an extracting operation of the data necessary for displaying closed caption character from the superimposed data and performs a closed caption decoding operation for the extracted data. The closed caption decoded by the closed caption decode circuit 111 is sent to the screen display control circuit 112 where the closed caption is superimposed on an image signal. The resultant superimposed signals are provided to the monitor 120 where the superimposed image is displayed on a screen. When subtitles of the language other than English such as Japanese has already been superimposed on the video software tape, a user inputs a desired display position of closed caption and the input is sent to the display position control circuit 114. After that, the display position control circuit 114 instructs the screen display control circuit 112 to display the closed caption at the desired position based on the user's input.

Next, when a user pauses the video cassette recorder 100, the pause control circuit 113 detects a pause signal outputted from the video cassette recorder 100 and then instructs the closed caption decode circuit 111 to perform a pause operation of the caption decode.

However, a conventional apparatus for learning English as explained above has drawbacks that it is very difficult for a user to pause the closed caption at a desired point and that closed caption is not displayed until the rotation of the head becomes stable after the pause operation is terminated.

SUMMARY OF THE INVENTION

This invention is accomplished in order to eliminate the above drawbacks and the object of the invention is to provide a closed caption decoder with a pause function, which enables caption pause at appropriate points and which avoids losing a part of the closed caption after the pause operation is terminated.

In order to realize the above object, a closed caption decoder according to the present invention comprises a closed caption decode means for decoding closed caption signals included in video signals outputted from a video cassette recorder and for outputting a detection signal when a predetermined control code is decoded; an input processing means for performing processing of input of an instruction indicating a termination of a pause operation from a user; and a pause control means for instructing the caption decode means to perform a pause operation of caption decode and the video cassette recorder to perform a pause of video reproduction when the detection signal is outputted from the closed caption decode means, and for outputting a pause termination signal of caption decode to the closed caption decoder and a pause termination signal of video reproduction to the video cassette recorder when an instruction indicating a termination of a pause operation is inputted from a user by the input processing means. Therefore, a pause of caption decode and a pause of video reproduction are performed at an appropriate timing.

Further, a closed caption decoder with a pause function suitable for learning a language according to the present invention comprises a closed caption decode means for decoding closed caption signals included in video signals outputted from a video cassette recorder and for outputting a detection signal when a predetermined control code is decoded; a timer which measures an elapse of time from a time when the predetermined control code is decoded; and a pause control means for instructing the caption decode means to perform a pause operation of caption decode and the video cassette recorder to perform a pause of video reproduction when the detection signal is outputted form the closed caption decode means and for outputting a pause termination signal of caption decode to the closed caption decoder and a pause termination signal of video reproduction to the video cassette recorder when the timer measures a first predetermined period of time. Therefore, it is not necessary for a user to terminate a pause operation at each time so that high operability can be available.

Further, a closed caption decoder can be structured such that it includes a timer setting means for setting the first predetermined period of time in the timer. With this structure, effective language learning can be realized because a pause maintaining period can be set by a user depending on the progress of the language learning.

Further, a closed caption decoder can be structured such that it further includes a video cassette recorder control circuit, connected to the pause control means, for controlling the video cassette recorder when the a pause termination signal of video reproduction is inputted from the pause control means in such a way that the pause operation of video reproduction is terminated, thereafter the video tape is rewound as much as a second predetermined period time and thereafter the video tape is reproduced. The provision of the video cassette recorder control circuit allows the closed caption decoder to avoid losing control codes of closed caption which would otherwise occur due to the instability at the time when the video tape begins to be played.

Further, a closed caption decoder can be structured such that a predetermined control code is a code indicating an erasure of closed caption displayed on a screen. With this structure, precise pause operation can be realized between closed captions.

BRIEF DESCRIPTION OF THE DRAWINGS

FIG. 4 is a flowchart showing operations of the manually pause terminating mode.

FIG. 5 is a flowchart showing operations of the timer pause terminating mode.

FIG. 6 is a block diagram showing the configuration of a conventional apparatus for studying English using a closed caption decoder.

DETAILED DESCRIPTION OF THE PREFERRED EMBODIMENTS

The preferred embodiments of the invention will be explained in detail with reference to the drawings.

Figure 1:
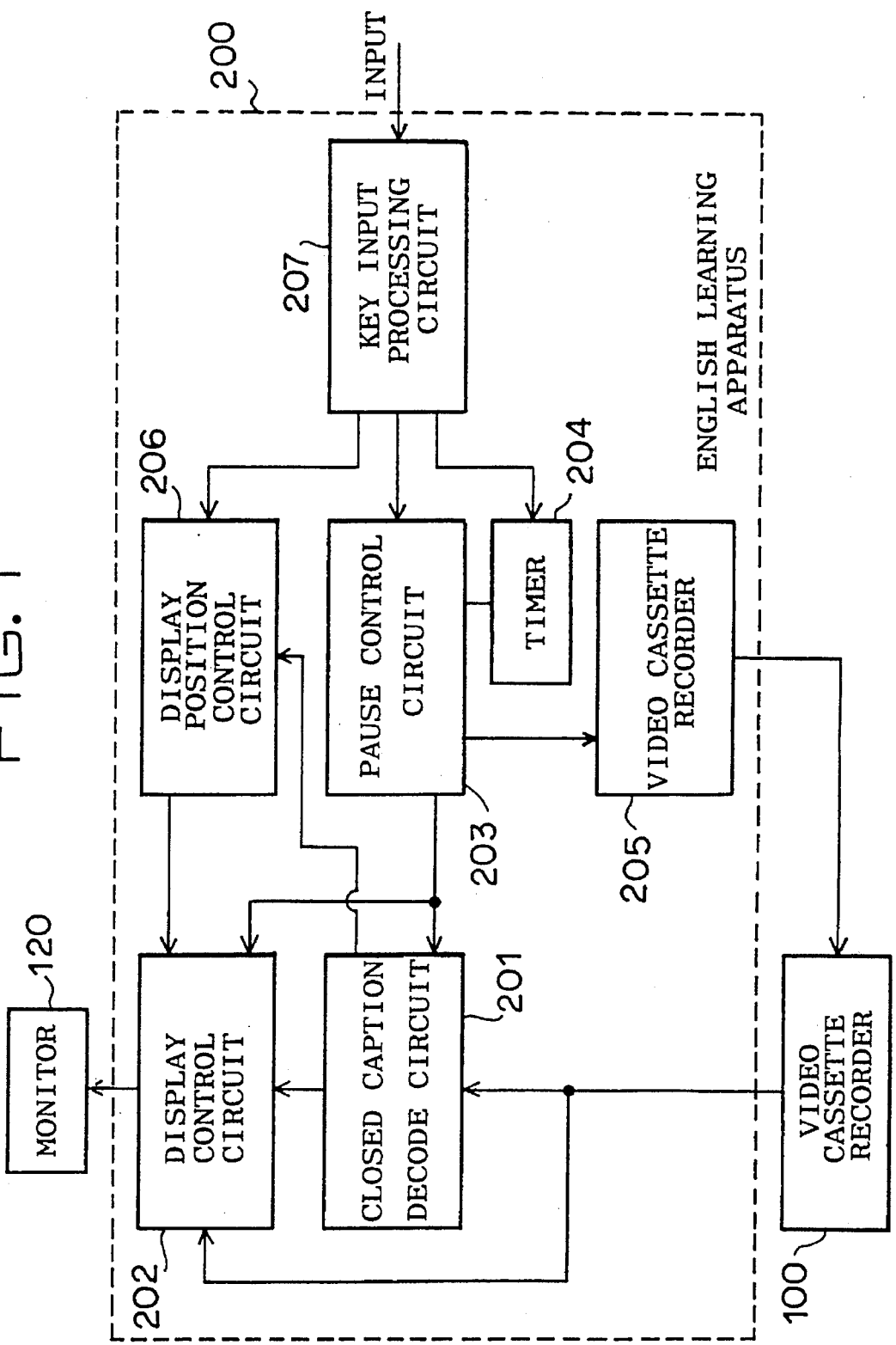
FIG. 1 is a block diagram showing a configuration of an apparatus for learning English according to the present invention together with a video cassette recorder which is to be connected to the apparatus.

FIG. 1 is a block diagram showing a configuration of an apparatus for learning English according to the present invention together with a video cassette recorder which is to be connected to the apparatus. In this figure, reference numeral 200 denotes an English learning apparatus, 201 denotes a closed caption decode circuit which extracts character signals from the closed caption signals included in the video signal outputted from the video cassette recorder 100 and which performs decoding processing to the character signals, 202 denotes a screen display control circuit which superimposes the closed caption decoded by the closed caption decode circuit 201 on the image from the video cassette recorder 100 and which outputs the superimposed image signal, 203 denotes a pause control circuit which controls a reproduction pause operation of the video cassette recorder 100 and a decode pause operation of the closed caption when the closed caption decode circuit 201 receives a predetermined control code for closed caption, 204 denotes a timer which produces timing for terminating a pause operation at a time when a predetermined time period elapses after the pause control circuit 203 begins a pause operation in a timer pause terminating mode, 205 denotes a video cassette recorder control circuit which terminates a pause operation of the video cassette recorder 100 and which instructs the video cassette recorder 100 to rewind the video tape as much as a predetermined period of time when the pause control circuit 203 terminates a pause operation, 206 denotes a display position control circuit which changes the display position of the closed caption, 207 denotes a key input processing circuit which processes key input operation from a user for inputting an instruction of caption display position for the display position control circuit 206, an instruction of a pause termination for the pause control circuit 203 and an instruction of setting a time period at the timer 204.

Firstly, video composite signals which are outputted from the video cassette recorder 100 are inputted to the closed caption decode circuit 201 where caption signals superimposed at the 21st line of the image signal are extracted so as to decode the caption signals. The decoded closed caption is superimposed on the image signals outputted from the video cassette recorder 100 in the display control circuit 202. The superimposed image signal is outputted to the monitor 120 where the superimposed image is displayed on the screen. Under the control of the display position control circuit 206, caption display control is performed such that the closed caption is displayed at the desired position on a screen according to the user's input to the key input processing circuit 207.

Figures 2A, 2B:
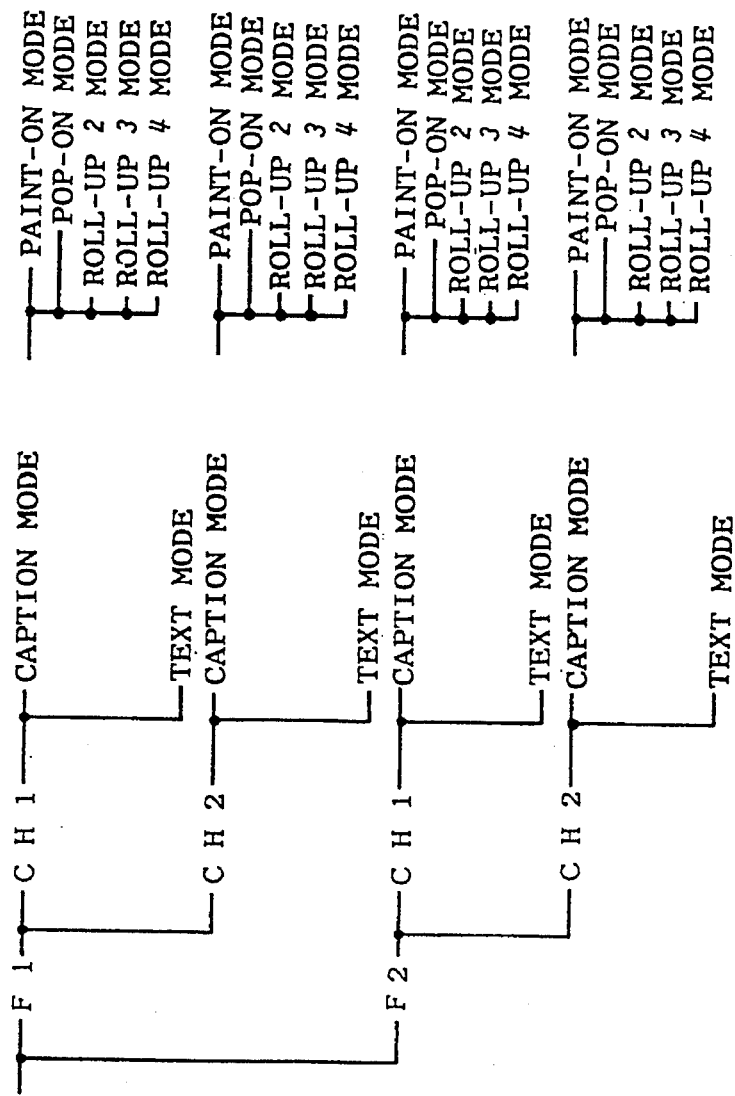
FIG. 2A is a tree diagram which hierarchically shows closed caption modes.
FIG. 2B is an illustration showing series of closed caption signals for the purpose of explaining caption modes depicted in FIG. 2A.

Next, closed caption modes will be explained. FIG. 2A is a tree diagram which hierarchically shows closed caption modes. As shown in this figure, the closed caption modes are firstly divided into closed caption of Field 1 (F1) and closed caption of Field 2 (F2). A user can select one of the two closed captions F1 and F2 and can display the selected one on a screen. Each field includes closed captions of channel 1 (CH1) and channel 2 (CH2). A user can also select one of the two channels CH1 and CH2 and can display the selected one on a screen. Further, each channel includes a caption mode in which the caption is displayed according to the change of the scene on a screen and a text mode in which the characters are displayed on a whole screen. A user can also select one of the two modes. Further, the caption mode includes a paint-on mode in which characters are displayed one by one in the order of the input of the characters, a pop-on mode in which characters are displayed on a screen at one time by a certain unit of characters such as a unit of sentence, a roll-up 2 mode in which an area of 2 lines is kept on a screen for caption and the characters are rolled up within the area, a roll-up 3 mode in which an area of 3 lines is kept on a screen for caption and the characters are rolled up within the area, a roll-up 4 mode in which an area of 4 lines is kept on a screen for caption and the characters are rolled up within the area.

For example, when caption signal of field 1 is encoded as shown in FIG. 2B and when a user selects field 1, channel 1 and caption mode, a character string "Hello." is displayed on a screen.

Figure 3:
FIG. 3 is a table in which the images on the screen, received commands and functions of the commands are indicated.
Figure 3:
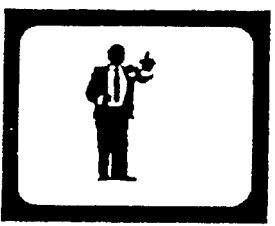
Figure 3:
Figure 3:

Next, pop-on mode which is one of the typical modes of the closed caption system will be explained. FIG. 3 is a table in which the images on the screen, received commands and functions of the commands are indicated.

Firstly, when the closed caption decode circuit 201 receives control command RCL [14,20] which serves as a pop-on mode designating code at step 1, the decode circuit 201 recognizes that the present mode is in pop-on mode. In pop-on mode, inputted character information is firstly stored in a non-display memory of a video RAM in the display control circuit 202. At step 2, ascii codes of a caption character string "THIS IS FOR YOU." as well as a control code [13,50] indicating a display position and display color is stored in the non-display memory. Namely, up to this step, the decoded caption has not yet been displayed on the screen of the monitor 120. At step 3, when a control code EOC [14,2F] indicating the end of caption is received, the non-display memory and display memory are swapped thereby the character string "THIS IS FOR YOU" inputted at step 2 is displayed on the screen. At step 4, when a control code [14,2C] indicating display memory erasure is received, the character string "THIS IS FOR YOU." inputted at step 2 is erased. At step 5, ascii codes of the caption character string "I CAN TAKE ANYTHING" as well as the control code [13,50] indicating a display position and a display color is stored in the non-display memory. Further, after that, ascii codes of a caption character string "WHAT I WANT." as well as the control code [13,70] indicating a display position and a display color is stored in the non-display memory. At step 6, when a control code EOC [14,2F] indicating the end of caption is received, the non-display memory and the display memory are swapped thereby the character string "WHAT I WANT." inputted at step 5 is displayed on the screen. In pop-on mode, several words of caption are displayed at one time by executing the above steps.

Next, the operations of the pause control circuit 203 will be explained, which is a main feature of the present invention. The modes of the operations of the pause control circuit 203 include a manually pause terminating mode and a timer pause terminating mode.

At first, an explanation will be made of the manually pause terminating mode. FIG. 4 is a flowchart showing operations of the manually pause terminating mode. As explained above, in pop-on mode, when the end of caption code EOC is received, a display of a set of words is completed by swapping the non-displaying memory and the display memory. At the same time, the audio signals corresponding to the caption are outputted from the video cassette recorder 100. Thereafter, when the EDM code [14,2C] indicating erasure of the caption is received and decoded by the closed caption decode circuit 201 (step ST401), the closed caption decode circuit 201 sends an EDM code detection signal to the pause control circuit 203 (step ST402). The pause control circuit 203 instructs the closed caption decode circuit 201 to perform a pause operation of the caption decode and via the video cassette recorder control circuit 205 instructs the video cassette recorder 100 to perform a pause operation of the reproduction (step ST403). Next, after a user understands the caption displayed on the screen and voice corresponding to the caption, when the user inputs an instruction of termination of the pause operation to the key input processing circuit 207 (step ST404), the key input processing circuit 207 instructs the pause control circuit 203 to terminate the pause operation. In response to this instruction, the pause control circuit 203 terminates the pause operation of the caption decode of the closed caption decode circuit 201 (step ST405). At the same time, the pause control circuit 203 sends an instruction of termination of a pause operation of the video cassette recorder 100 to the video cassette recorder control circuit 205. The video cassette recorder control circuit 205 terminates a pause operation of the video cassette recorder 100 and controls the video cassette recorder 100 such that the recorder 100 rewinds the video tape as much as a few seconds and reproduces the rewound tape again (step ST406). The object of rewinding the tape as much as a few seconds and reproducing the rewound tape is to avoid losing control codes such as an RCL code. As explained above, a pause operation can be performed at an appropriate timing by utilizing control codes of the closed caption.

Next, an explanation will be made of the timer pause terminating mode. FIG. 5 is a flowchart showing operations of the timer pause terminating mode. A user previously sets a pause maintaining time period in the timer 204 via key input processing circuit 207 (step ST501). The closed caption decode circuit 201 receives the control code [4,2C] indicating display screen clear (step ST502). After the completion of swapping the display memory and the non-display memory, the closed caption decode circuit 201 sends an EDM code detection signal to the pause control circuit 203 (step ST503). The pause control circuit 203 instructs the closed caption decode circuit 201 to perform a pause operation of the caption decode and instructs, via the video cassette recorder control circuit 205, the video cassette recorder 100 to perform a pause operation of the reproduction (step ST504). Upon performing a pause operation, the timer 204 begins to operate (step ST505). When the pause maintaining time period set by a user has elapsed (step ST506), the pause control circuit 203 instructs the closed caption decode circuit 201 to terminate the pause operation of the caption decode (step ST507). The pause control circuit 203 sends an instruction of termination of the pause operation of the video cassette recorder 100 to the video cassette recorder control circuit 205. The video cassette recorder control circuit 205 terminates a pause operation of the video cassette recorder 100 and controls the video cassette recorder 100 such that the recorder 100 rewinds the video tape as much as a few seconds and reproduces the rewound tape again (step ST508).

As explained above, it is not necessary for a user to input an instruction of pause termination each time a pause operation is performed because a pause maintaining time period is previously set by a user and a pause operation is terminated automatically after the time period has elapsed each time a pause operation is performed. Further, if a user changes the time period to be set in the timer 204 according to his or her listening ability, an effective leaning of English can be obtained.

Although, the above embodiment is explained when the pop-on mode is selected out of variety of caption modes, pause operations of caption decode and video tape can be obtained in the similar way even when another mode is selected.

Further, in the above embodiment, a pause operation is performed when an EDM code is received. However, another caption code can be used for determining when a pause operation is performed. For example, in paint-on mode, the apparatus for learning English may perform a pause operation when a control code RDC indicating entering into paint-on mode is received. In roll-up 2 mode, the apparatus may perform a pause operation when a caption code CR indicating a carriage return is received twice after a caption code RU2 is received, indicating a command to keep an area of 2 lines on a screen and to enter into roll-up mode. In roll-up 3 mode, the apparatus may perform a pause operation when a caption code CR indicating a carriage return is received three times after a caption code RU3 is received, indicating a command to keep an area of 3 lines on a screen and to enter into roll-up mode. In roll-up 4 mode, the apparatus may perform a pause operation when a caption code CR indicating a carriage return is received four times after a caption code RU4 is received, indicating a command to keep an area of 4 lines on a screen and to enter into roll-up mode. In text mode, the apparatus may perform a pause operation when a caption code TR indicating a command to enter into text mode or a caption code RTD indicating a command to erase caption characters on a screen and to enter into text mode. Furthermore, other control codes of closed caption can be used for determining when a pause operation is performed.

In the above embodiments, video signals sent from the display control circuit 202 to the monitor 120 may be composite signals or RGB signals. By providing the above explained English learning apparatus 200 in the video cassette recorder 100, a video cassette recorder with a pause function for learning English can be realized. Moreover, the apparatus for learning a language other than English may be realized by changing code system of closed caption.

What is claimed is:

1. A closed caption decoder with a pause function suitable for learning a language, comprising:

a closed caption decode means for decoding closed caption signals included in video signals outputted from a video cassette recorder and for outputting a detection signal when a predetermined control code is decoded;

an input processing means for performing processing of input of an instruction indicating a termination of a pause operation from a user; and a pause control means for instructing the caption decode means to perform a pause operation of caption decode and the video cassette recorder to perform a pause of video reproduction when the detection signal is outputted from the closed caption decode means, and for outputting a pause termination signal of caption decode to the closed caption decoder and a pause termination signal of video reproduction to the video cassette recorder when an instruction indicating a termination of a pause operation is inputted from a user by the input processing means.

2. A closed caption decoder with a pause function suitable for learning a language, comprising:

a closed caption decode means for decoding closed caption signals included in video signals outputted from a video cassette recorder and for outputting a detection signal when a predetermined control code is decoded;

a timer which measures an elapse of time from a time when the predetermined control code is decoded; and a pause control means for instructing the caption decode means to perform a pause operation of caption decode and the video cassette recorder to perform a pause of video reproduction when the detection signal is outputted form the closed caption decode means and for outputting a pause termination signal of caption decode to the closed caption decoder and a pause termination signal of video reproduction to the video cassette recorder when the timer measures a first predetermined period of time.

3. A closed caption decoder according to claim 2, further including a timer setting means for setting the first predetermined period of time in the timer.

4. A closed caption decoder according to claim 1, further including a video cassette recorder control circuit, connected to the pause control means, for controlling the video cassette recorder when the pause termination signal of video reproduction is inputted from the pause control means in such a way that the pause operation of video reproduction is terminated, thereafter the video tape is rewound as much as a second predetermined period of time and thereafter the video tape is reproduced.

5. A closed caption decoder according to claim 2, further including a video cassette recorder control circuit, connected to the pause control means, for controlling the video cassette recorder when the pause termination signal of video reproduction is inputted from the pause control means in such a way that the pause operation of video reproduction is terminated, thereafter the video tape is rewound as much as a second predetermined period of time and thereafter the video tape is reproduced.

6. A closed caption decoder according to claim 3, further including a video cassette recorder control circuit, connected to the pause control means, for controlling the video cassette recorder when the pause termination signal of video reproduction is inputted from the pause control means in such a way that the pause operation of video reproduction is terminated, thereafter the video tape is rewound as much as a second predetermined period of time and thereafter the video tape is reproduced.

7. A closed caption decoder according to claim 1, wherein the predetermined control code is a code indicating an erasure of closed caption displayed on a screen.

8. A closed caption decoder according to claim 2, wherein the predetermined control code is a code indicating an erasure of closed caption displayed on a screen.

9. A closed caption decoder according to claim 3, wherein the predetermined control code is a code indicating an erasure of closed caption displayed on a screen.

10. A closed caption decoder according to claim 4, wherein the predetermined control code is a code indicating an erasure of closed caption displayed on a screen.

11. A closed caption decoder according to claim 5, wherein the predetermined control code is a code indicating an erasure of closed caption displayed on a screen.

12. A closed caption decoder according to claim 6, wherein the predetermined control code is a code indicating an erasure of closed caption displayed on a screen.

\* \* \* \* \*